United States Patent
Fledersbacher et al.

(10) Patent No.: US 7,600,379 B2
(45) Date of Patent: Oct. 13, 2009

(54) EXHAUST GAS TURBOCHARGER FOR AN INTERNAL COMBUSTION ENGINE

(75) Inventors: Peter Fledersbacher, Stuttgart (DE); Paul Löffler, Stuttgart (DE); Michael Scherrieble, Esslingen (DE); Siegfried Sumser, Stuttgart (DE); Siegfried Weber, Stuttgart (DE)

(73) Assignee: Daimler AG, Stuttgart (DE)

( * ) Notice: Subject to any disclaimer, the term of this patent is extended or adjusted under 35 U.S.C. 154(b) by 208 days.

(21) Appl. No.: 11/704,707

(22) Filed: Feb. 9, 2007

(65) Prior Publication Data

US 2007/0180825 A1    Aug. 9, 2007

Related U.S. Application Data

(63) Continuation-in-part of application No. PCT/EP2005/008632, filed on Aug. 9, 2005.

(30) Foreign Application Priority Data

Aug. 10, 2004 (DE) .................. 10 2004 038 748

(51) Int. Cl.
*F02D 23/00* (2006.01)
*F01B 25/02* (2006.01)
*F04D 15/00* (2006.01)
*F04D 27/00* (2006.01)

(52) U.S. Cl. .................. 60/602; 415/164; 415/160
(58) Field of Classification Search .................. 60/602; 415/159–164
See application file for complete search history.

(56) References Cited

U.S. PATENT DOCUMENTS

| | | | | |
|---|---|---|---|---|
| 4,657,476 A * | 4/1987 | Berg | .................. | 415/164 |
| 4,685,869 A * | 8/1987 | Sasaki | .................. | 415/164 |
| 4,804,316 A | 2/1989 | Fleury | .................. | 415/164 |
| 4,809,509 A * | 3/1989 | Hohkita | .................. | 60/605.1 |
| 4,907,952 A * | 3/1990 | Inoue et al. | .................. | 417/407 |
| 6,558,117 B1 * | 5/2003 | Fukaya et al. | .................. | 415/164 |
| 6,824,355 B2 * | 11/2004 | Behrendt et al. | .................. | 415/160 |
| 6,951,450 B1 * | 10/2005 | Figura et al. | .................. | 417/407 |
| 7,121,788 B2 * | 10/2006 | Daudel et al. | .................. | 415/159 |
| 7,189,058 B2 * | 3/2007 | Metz et al. | .................. | 415/165 |
| 7,303,370 B2 * | 12/2007 | Metz et al. | .................. | 415/160 |

(Continued)

FOREIGN PATENT DOCUMENTS

DE    102 37 413    3/2004
WO    WO 02/06637    1/2002

*Primary Examiner*—Thai Ba Trieu
(74) *Attorney, Agent, or Firm*—Klaus J. Bach

(57) ABSTRACT

In an exhaust gas turbocharger for an internal combustion engine including an exhaust gas turbine in the exhaust line and a compressor in the intake tract of the internal combustion engine, and the exhaust gas turbine includes a gas inlet passage with a variable guide vane structure supported on one side of a support ring arranged in the inlet flow passage to the turbine wheel, the support ring is mounted in a floating manner such that the side thereof, which faces away form the guide vanes is exposed to the gas pressure in the inlet flow passage in order to bias the support ring toward the opposite inlet flow passage wall and spacer sleeves with expansion properties similar to those of the guide vanes are provided between the support ring and the opposite flow passage wall for delimiting the clearance between the guide vanes and the opposite flow passage wall.

7 Claims, 3 Drawing Sheets

U.S. PATENT DOCUMENTS

| | | | |
|---|---|---|---|
| 7,322,791 B2* | 1/2008 | Stilgenbauer | 415/164 |
| 7,351,042 B2* | 4/2008 | Jinnai et al. | 415/164 |
| 7,364,401 B2* | 4/2008 | Nakagawa et al. | 415/164 |
| 7,431,560 B2* | 10/2008 | Sterner | 415/164 |
| 2003/0170117 A1* | 9/2003 | Knauer et al. | 415/160 |
| 2004/0081567 A1 | 4/2004 | Boening | 417/406 |
| 2006/0062663 A1* | 3/2006 | Figura et al. | 415/160 |
| 2007/0130943 A1* | 6/2007 | Sausse et al. | 60/602 |
| 2008/0075582 A1* | 3/2008 | Sausse et al. | 415/159 |

* cited by examiner

EXHAUST GAS TURBOCHARGER FOR AN INTERNAL COMBUSTION ENGINE

This is a Continuation-In-Part Application of pending International Patent Application PCT/EP2005/008632 filed Aug. 9, 2005 and claiming the priority of German Patent Application 10 2004 038 748.6 filed Apr. 10, 2004.

BACKGROUND OF THE INVENTION

The invention relates to an exhaust gas turbocharger for an internal combustion engine including a turbine with a variable guide vane structure supported in the turbine inlet flow passage by a support ring.

Document DE 102 37 413 A1 discloses an exhaust gas turbocharger, which comprises an exhaust gas turbine in the exhaust line of the internal combustion engine and a compressor in the intake tract, with the turbine wheel of the exhaust gas turbine driving the compressor wheel in the compressor via a shaft. The compressor sucks the combustion air from the environment and compresses it to an increased charge pressure, under which the combustion air is supplied to the cylinders of the internal combustion engine. At the exhaust gas, side of the internal combustion engine, the pressurized exhaust gases of the internal combustion engine drive the turbine wheel.

In order to improve its power output, the exhaust gas turbine is provided with a variable turbine inlet geometry which permits adjustment of the effective inlet flow cross-section to the turbine wheel. The variable turbine geometry (VTG) arrangement can be used to increase power both in the engine operating mode and in the engine braking mode. The variable turbine geometry arrangement is embodied as an adjustable guide vane structure which comprises a support ring with guide vanes disposed at one endface thereof. The guide vanes are situated in the flow inlet cross section and can be pivoted about a rotational axis between a minimum blocking position and a maximum opening position.

The guide vane gap required to ensure efficient operation for rotor blade turbine geometries is determined by the material and the geometry of the guide vanes and by the position and the material of the spacer sleeves which serve to set the cold play of the guide vane structure. A further influential variable is the misalignment, resulting from thermal and mechanical loading, between the two running faces (the end face of the guide vane support ring and the Machined facing contour of the turbine housing) at which the guide vanes should terminate with the smallest possible gap. Since the spacing between the two running faces is generally determined by only three spacer sleeves, it is possible, in particular in the case of large exhaust gas turbines, that the operating gap varies significantly from one guide vane to another. This has the result that, for example in the event of a fast rise in the exhaust gas temperature, the spacer sleeves heat up and expand significantly more slowly than the guide vanes.

In order to prevent the guide vanes from becoming jammed with the smallest gap, it is therefore necessary to provide a relatively large cold play and to accept corresponding losses in efficiency.

It is the object of the present invention to improve the efficiency of exhaust gas turbochargers using simple means. Gaps between the end sides of guide vanes in the flow inlet cross section and the adjacent housing wall should expediently be reduced by design features causing no energy consumption.

SUMMARY OF THE INVENTION

In an exhaust gas turbocharger for an internal combustion engine including an exhaust gas turbine in the exhaust line and a compressor in the intake tract of the internal combustion engine, and the exhaust gas turbine includes a gas inlet passage with a variable guide vane structure supported on one side of a support ring arranged in the inlet flow passage to the turbine wheel, the support ring is mounted in a floating manner such that the side thereof, which faces away form the guide vanes is exposed to the gas pressure in the inlet flow passage in order to bias the support ring toward the opposite inlet flow passage wall and spacer sleeves with expansion properties similar to those of the guide vanes are provided between the support ring and the opposite flow passage wall for delimiting the clearance between the guide vanes and the opposite flow passage wall.

The support ring, as a constituent part of the guide vane structure, which is mounted in a floating manner in the supporting wall section, makes an axial compensating movement possible. In addition, in the exhaust gas turbocharger according to the invention, the rear side, which faces away from the guide vanes, of the support ring is exposed to the pressure prevailing in the inflow duct of the exhaust gas turbocharger. Since a lower pressure prevails in the inlet flow cross section to the turbine wheel than in the inflow duct because of the flow acceleration in the guide vane structure, an axial force is exerted on the support ring in the direction of the opposite housing wall section which delimits the flow inlet cross section. The guide vanes which are retained on the support ring are therefore pressed by the resultant force against the wall adjacent to the end faces of the guide blades, reliably preventing gap formation and suppressing leakage flows. This considerably improves the efficiency of the exhaust gas turbocharger as a minimum gap can be maintained under all operating conditions, that is to say both in the cold and in the warm operating state. Since the resultant force is generated merely by the pressure difference between the front side and the rear side of the support ring of the guide vane structure, no active, energy-consuming adjusting elements are required for adjusting the guide vane structure. No expensive controllers are therefore necessary. The pressure difference between the rear side of the support ring (high pressure) and the front side of the support ring (relatively low pressure) is sufficient to displace the support ring including the guide vanes in the desired direction.

It is fundamentally sufficient for the support ring to be mounted in a floating fashion in a radial section of the bearing housing or of the turbine housing and therefore to be capable of carrying out an axial movement relative to said supporting wall section. It is not necessary to design the wall section to also be moveable relative to the surrounding housing parts of the turbine housing. The wall section which holds the support ring can, moreover, be a fixed part of the housing, in particular of a bearing housing by which turbocharger shaft is supported and which is a part of the exhaust gas turbocharger. Since the support ring has an only relatively low weight, even relatively small pressure differences between the front and rear sides of the support ring are sufficient to act on the latter with an adjusting force in the direction of the opposing wall section.

In order to provide a sufficiently high pressure on the rear side of the support ring, the rear side of the support ring advantageously is in communication with the inflow duct by means of a connecting gap, with the connecting gap preferably branching off from the inflow duct at a distance from the guide vanes in order to ensure that the maximum pressure in the inflow duct is applied to the rear side of the support ring. A pressure drop already prevails in the region of the guide vanes which are arranged on the front side of the support ring, thus generating the pressure difference between the front and rear sides of the support ring. In order to be able to maintain said pressure difference, a seal, expediently formed by a piston ring, is provided on the inner lateral surface of the support ring. A sealing ring could also be used instead of a piston ring.

The connecting gap by means of which the rear side of the support ring is in communication with the inflow duct preferably extends along the radially outer lateral surface of the support ring. The connecting gap thereby fulfills a dual function: on the one hand, it communicates the pressure from the inflow duct to the rear side of the support ring; on the other hand, it ensures that the support ring is guided at its radially outer side without friction or obstruction, so that the axial adjusting movement of the support ring is not impeded.

The axial length of the path within which the support ring can move axially is expediently delimited in both directions. Firstly, a housing-mounted stop can be provided, which stop delimits the axial mobility of the support ring at the side facing away from the guide vanes. Secondly, spacers, preferably in the form of thin-walled sleeves, can be arranged in the flow inlet cross section, which spacer sleeves extend between the support ring and the wall against which the end faces of the guide vanes bear. The spacer sleeves serve to set a defined minimum play between the guide blades and the facing contour of the turbine housing. The spacer sleeves are expediently formed, in particular with regard to their geometry and their material, so as to expand and contract in approximately the same way as the guide vanes of the guide vane structure when the temperature changes. Heat-related jamming of the guide blades in the flow inlet cross section is avoided in this way.

The invention will be described below in greater detail with reference to the accompanying drawings:

DESCRIPTION OF PREFERRED EMBODIMENTS

In the figures, identical components are provided with the same reference symbols.

Figure 1:
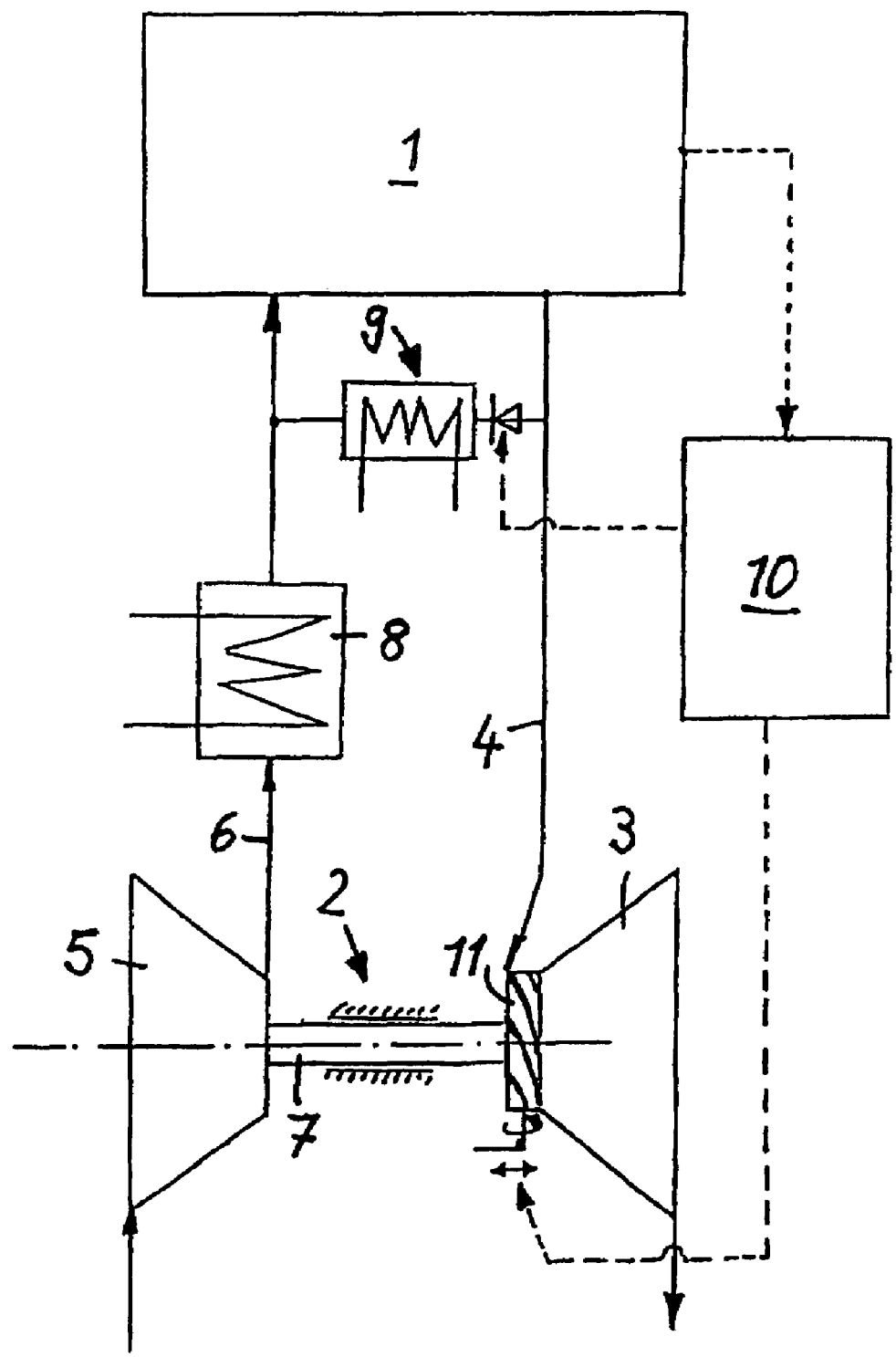
FIG. 1 is a schematic illustration of a turbo-charged Internal combustion engine.

The internal combustion engine 1—a spark-ignition Engine or a diesel internal combustion engine—as illustrated in FIG. 1 includes an exhaust gas turbocharger 2 which comprises an exhaust gas turbine 3 in the exhaust line 4 and a compressor 5 in the intake tract 6 of the internal combustion engine. The turbine wheel of the exhaust gas turbine 3 is rotationally fixedly coupled by means of a shaft 7 to the compressor wheel in the compressor 5, so that combustion air is sucked from the environment and is compressed to an increased charge pressure in the compressor when the shaft 7 is driven by the turbine wheel. Downstream of the compressor 5, the compressed combustion air is firstly supplied to a charge air cooler 8 and is cooled therein. The combustion air is then conducted under charge pressure to the cylinders of the internal combustion engine 1.

At the exhaust gas side, the exhaust gases discharged by the internal combustion engine 1 flow into the exhaust line 4 and are supplied therein to the exhaust gas turbine 3, where the highly pressurized exhaust gases drive the turbine wheel 12. After passing through the exhaust gas turbine 3, the exhaust gases are in the expanded state and, after purification, are discharged into the atmosphere.

An exhaust gas recirculation device 9 is additionally provided, which comprises a recirculation line extending between the exhaust gas line 4 upstream of the exhaust gas turbine 3 and the intake tract 6 downstream of the charge air cooler 8, with an adjustable valve and an exhaust gas cooler being arranged in the recirculation line.

It is possible by means of an open-loop and closed-loop control unit 10 for all the adjustable units of the internal combustion engine to be adjusted as a function of engine operating variables. The adjustable units include in particular the valve of the exhaust gas recirculation device 9 and a variable turbine inlet guide vane structure 11 in the exhaust gas turbine 3, by means of which the effective inlet flow cross section to the turbine wheel can be variably adjusted. The variable turbine inlet guide vane structure is to be adjusted in particular between a blocking position, which minimizes the free flow inlet cross section, and a maximum opening position.

Figure 2:
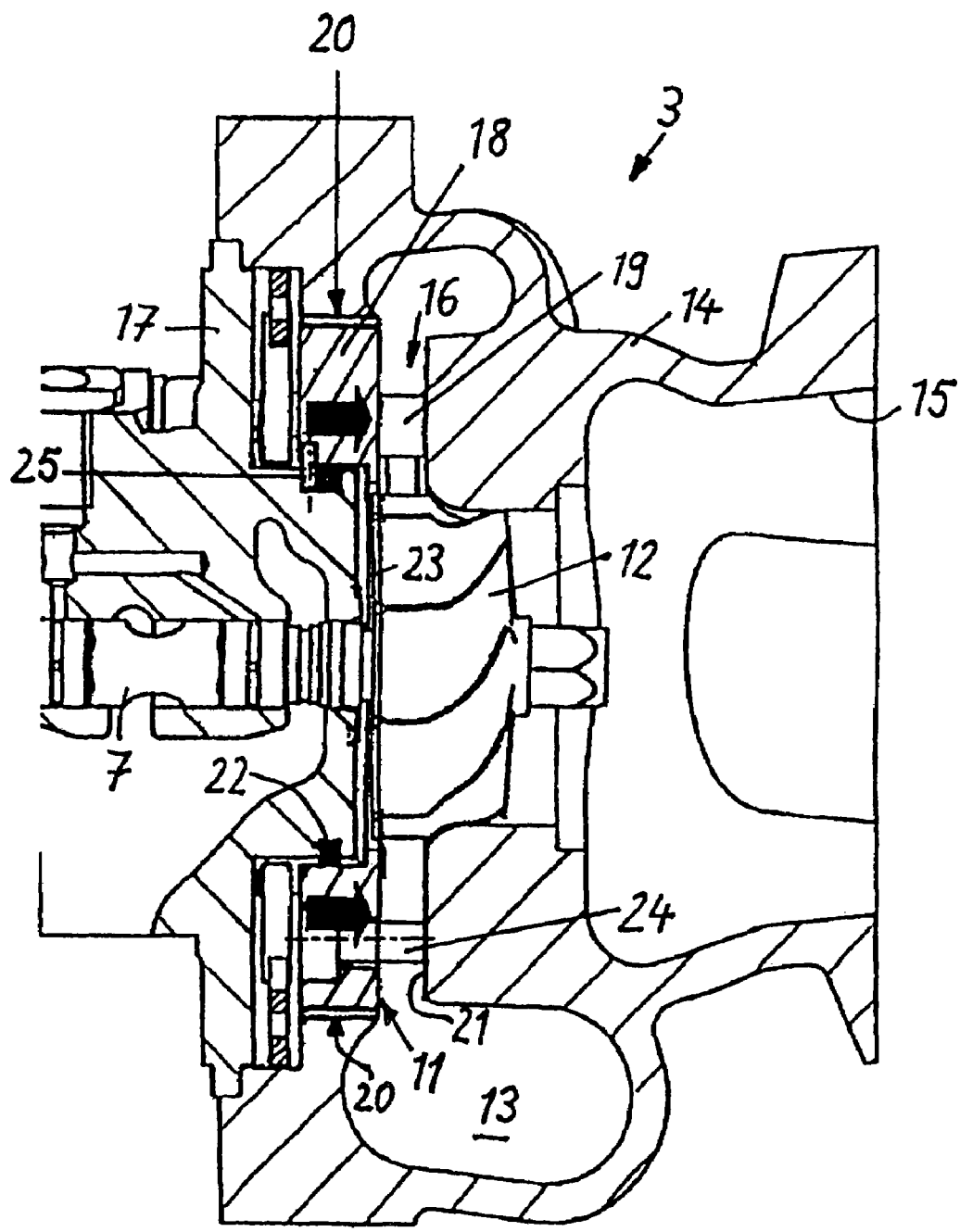
FIG. 2 shows, in a cross-sectional view, the exhaust gas turbine of the exhaust gas turbocharger which is used in the internal combustion engine.

The exhaust gas turbine 3 illustrated in section in FIG. 2 has, in a turbine housing 14, an inflow duct 13 which is formed as a spiral duct, is arranged upstream of the turbine wheel 12 and is supplied with exhaust gas via the exhaust line 4 of the internal combustion engine. The inflow duct 13 opens out radially by means of an inlet flow passage 16 into a duct in which the turbine wheel 12 is rotatably mounted. Exhaust gas flowing in via the inlet flow passage 16 impinges radially on the turbine wheel 12 of high speed thereby driving the turbine wheel 12 and, in the expanded state, exit the exhaust gas turbine axially via an outlet duct 15.

The exhaust gas turbine 3 is equipped with a variable turbine guide vane structure 11 which comprises a guide vane support ring 18 and guide vanes 19 arranged on the support ring. The guide vanes 19 are uniformly distributed over the circumference of the support ring and are pivotably supported at an end face of the support ring. The guide vanes 19 project into the inlet flow passage 16 and extend axially between the end face of the support ring 18, on which the guide vanes are supported, and an opposing wall section 21 of the turbine housing 14.

The angular position of the guide vanes 19 can be Adjusted by means of an adjusting element, as a result of which, on the one hand, the effective free inlet flow cross section is varied and, on the other hand, the through-flow of exhaust gas, in particular the angular momentum which is to be imparted to the exhaust gas and with which the exhaust gas impinges on the turbine wheel 12, can be adjusted.

The support ring 18 is held in a bearing housing 17 formed separately from the turbine housing 14. The bearing housing 17 is a part of the exhaust gas turbocharger and rotatably supports the shaft 7. The bearing housing 17 has an axial shoulder which forms a recess into which the support ring 18 is inserted. The front side of the support ring 18, which faces the wall section 21 and on which the guide blades 19 are arranged, forms a wall which delimits the inlet flow cross section 16.

In order to maintain the pressure difference between the side of the support ring 18 which faces the inlet flow cross section 16 and that side of the support ring 18 which faces the bearing housing 17, a piston ring 22 is provided on the inner lateral surface of the support ring 18.

The rear side of the support ring 18, that is to say that wall side of the support ring 18 which faces away from the guide vanes 19, is in communication, by way of a communication gap 20 with the inflow duct 13. The communication gap 20 is formed on the radially outer side of the support ring 18. The communication gap 20 permits a friction-free axial movement of the support ring 18, since contact between the radially outer lateral surface of the support ring and the facing inner wall of the turbine housing 14 is avoided. The communication gap 20 branches off in the inflow duct 13 at a distance from the guide vanes 19, in particular at a greater radial distance from the turbine shaft than the guide vanes. This results in the maximum pressure prevailing in the inflow duct 13 being transmitted via the communication gap 20 to the rear side of the support ring 18, so that the rear side of the support ring is exposed to the pressure present in the inflow duct 13.

In contrast, a considerable pressure drop prevails in the region of the guide vanes 19 radially from the outside to the inside, with the result that a lower pressure prevails on the front face of the support ring 18, which is adjacent to the inlet flow passage 16, than on the rear side of the support ring 18. This generates a resultant force which acts in the axial direction towards the wall section 21, as indicated by the arrows, and acts on the support ring 18 including the guide vanes 19. This resultant force presses the end faces of the guide vanes 19 against the facing-wall section 21 of the turbine housing 14. The guide vane gaps are in this way reduced to a minimum value predefined by spacer sleeves 24. Within the context of the embodiment according to the invention, it is possible to obtain minimum values of the guide blade (cold) play of between 0.02 and 0.1 mm.

It is expedient for the support ring 18 to be adjustable in only the axial direction and not moveable in the radial direction. The axial movement is delimited on the side facing away from the guide vanes by a stop which is provided on the bearing housing 17. In order to delimit the adjusting movement in the opposite direction, spacer sleeves 24 are arranged axially in the flow inlet cross section 16, which spacer sleeves 24 can in particular be retained on the support ring 18 but may alternatively also be retained on the opposing wall section 21. Spacer sleeves of said type are distributed over the periphery of the support ring 18 and are illustrated in detail in FIGS. 4 to 6.

The angular position of the support ring 18 in the bearing housing 17 is defined by means of a positioning pin 25 which is positioned on the bearing housing 17. The Positioning pin 25 permits an axial movement of the support ring 18 and can, however, form a stop for the movement away from the wall section 21 if appropriate.

A heat shield 23 is arranged on the rear wall of the turbine wheel 12, which heat shield 23 shields the bearing housing 17 from the heat generated by the turbine wheel 12. In the embodiment shown, the heat shield 23 is formed in one piece with the support ring 18 and extends at the radially inner side thereof up to the shaft 7.

Figure 3:
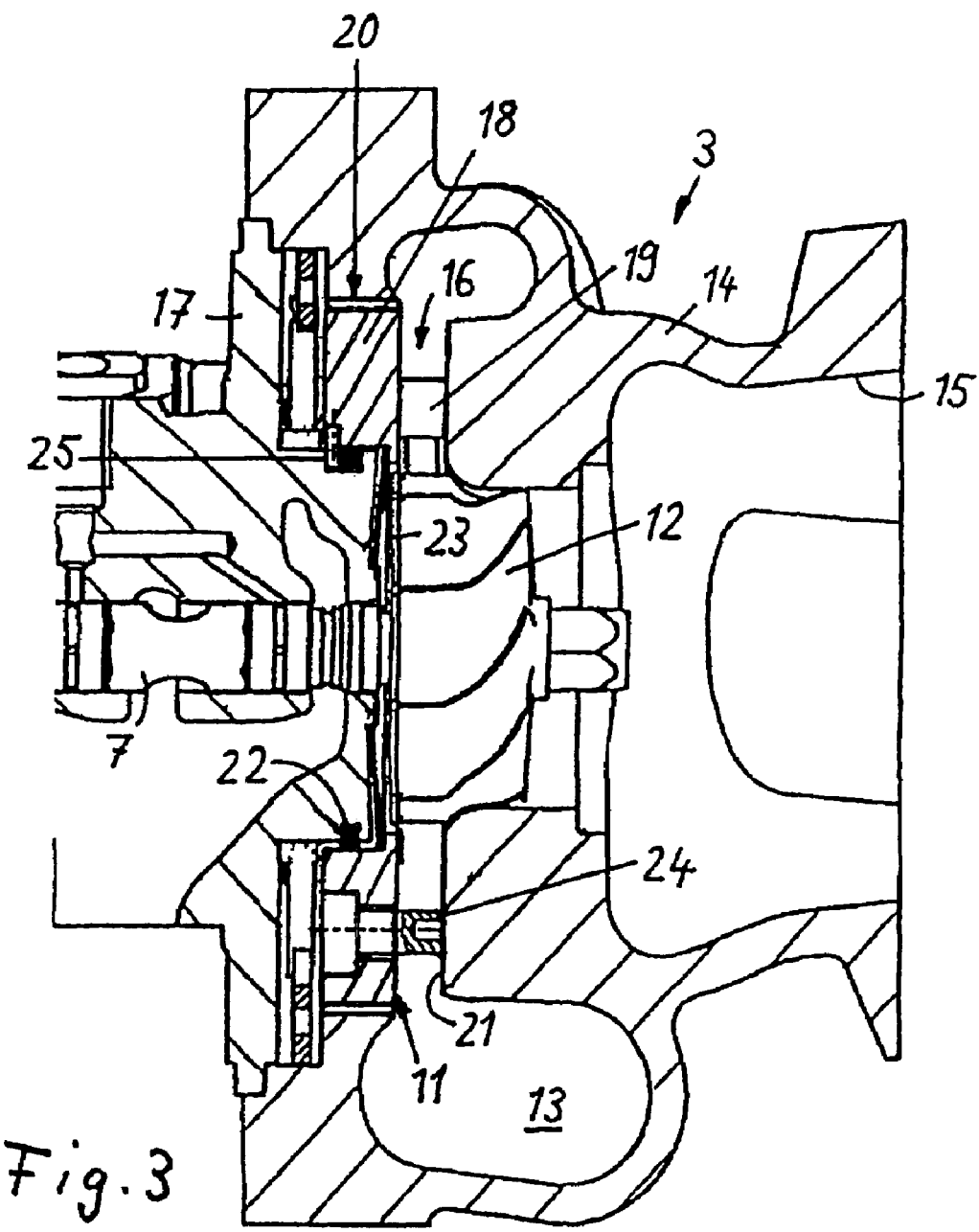
FIG. 3 is a cross-sectional view of an exhaust gas Turbine in an alternative embodiment.

The design embodiment and mode of operation of the Exhaust gas turbine 3 illustrated in section in FIG. 3 corresponds to that of the preceding exemplary embodiment, but with the difference that the heat shield 23 is formed as a separate component from the support ring 18. The heat shield 23 helps to radially fix the support ring 18. In addition, said heat shield 23 which is in the form of a plate spring makes it possible to act on the support ring 18 with a defined preload which presses the support ring 18 in the direction of the housing wall 21 regardless of the gas forces.

It can also be seen from said illustration that the spacer sleeve 24 is hollow, resulting in similar thermal expansion behavior to that of the guide vanes 19.

Figure 4:
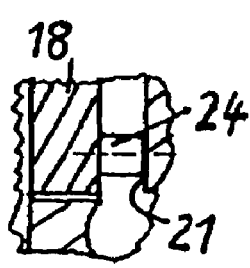
FIGS. 4 to 6 show various spacer sleeves which are Arranged in the flow inlet cross section between a vane support ring and an adjoining turbine wall section.
Figure 5:
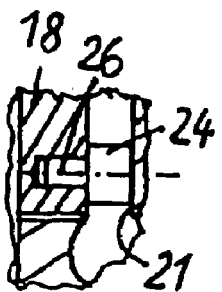
Figure 6:
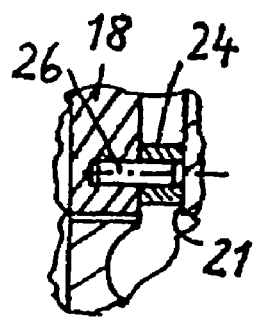

FIGS. 4 to 6 illustrate various embodiments of the spacer sleeve 24 which is arranged in the inlet flow passage axially between the support ring 18 and the adjacent wall section 21. In FIG. 4, the spacer sleeve 24 is formed in one piece with the support ring 18. In FIG. 5, the spacer sleeve 25 and the support ring 18 are formed as two separate components, with a pin 26 of the spacer sleeve 24 projecting into a complementarily shaped recess in the support ring 18. In FIG. 6, the pin is formed separately from the spacer sleeve 24, with the pin projecting into the hollow cylindrical interior space of the spacer sleeve.

What is claimed is:

1. An exhaust gas turbocharger for an internal combustion engine, including:
    an air intake tract (6),
    an exhaust gas line (4),
    a compressor (5) disposed in the air intake tract (6) of the internal combustion engine (1),
    an exhaust gas turbine (3) having a turbine housing (14) with a turbine wheel (12) and being disposed in the exhaust gas line (4), the exhaust gas turbine (3) having an inflow duct (13) arranged upstream of the turbine wheel (12) in the turbine housing (14) of the exhaust gas turbine (3),
    a variable turbine guide vane structure (11) arranged in an inlet flow passage (16) of the inflow duct (13) to the turbine wheel (12), said variable turbine guide vane structure (11) comprising a support ring (18) with guide vanes (19) supported on one side of the support ring (18) and the support ring (18) being mounted in a floating manner in a wall section (21) of the turbine housing (14), and
    spacer sleeves (24) arranged in the inlet flow passage (16), so as to define an end-side operating gap of the guide vanes (19) having a predetermined size between 0.02 and 0.1 mm as measured in the cold state, the spacer sleeves (24) consisting of a material having expansion properties which match expansion properties of the guide vanes (19) during temperature changes in the inlet flow passage (16) in order to maintain the end side operating gap of the guide vanes (19) with changing temperatures at the predetermined size.

2. The exhaust gas turbocharger as claimed in claim 1, wherein the spacer sleeve (24) has an opening in its side facing away from the support ring (18).

3. The exhaust gas turbocharger as claimed in claim 2, wherein the spacer sleeve (24) is connected to the support ring (18) by a detachable connection.

4. The exhaust gas turbocharger as claimed in claim 3, wherein the detachable connection is a screw connection.

5. The exhaust gas turbocharger as claimed in claim 1, wherein the spacer sleeve (24) is formed in one piece with the support ring (18).

6. The exhaust gas turbocharger as claimed in claim 1, wherein the spacer sleeve (24) is disposed on a shaft (26), with the shaft (26) being supported by the support ring (18).

7. The exhaust gas turbocharger as claimed in claim 6, wherein the shaft (26) is formed separately from the spacer sleeve (24).

* * * * *